United States Patent
Lee

(10) Patent No.: US 10,131,353 B2
(45) Date of Patent: Nov. 20, 2018

(54) VEHICLE AND METHOD FOR CONTROLLING THE SAME

(71) Applicant: HYUNDAI MOTOR COMPANY, Seoul (KR)

(72) Inventor: Sihyoung Lee, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 465 days.

(21) Appl. No.: 14/947,475

(22) Filed: Nov. 20, 2015

(65) Prior Publication Data

US 2017/0057504 A1 Mar. 2, 2017

(30) Foreign Application Priority Data

Sep. 2, 2015 (KR) .................. 10-2015-0123965

(51) Int. Cl.
*B60W 30/16* (2012.01)
*B60W 30/14* (2006.01)
*B60W 40/08* (2012.01)

(52) U.S. Cl.
CPC .......... *B60W 30/16* (2013.01); *B60W 30/143* (2013.01); *B60W 40/08* (2013.01);
(Continued)

(58) Field of Classification Search
CPC ............. B60W 30/16; B60W 40/08; B60W 2550/302; B60W 2720/10; B60W 2540/00
See application file for complete search history.

(56) References Cited

U.S. PATENT DOCUMENTS 6,989,754 B2 * 1/2006 Kisacanin ............... A61B 5/18
340/435
8,406,457 B2 * 3/2013 Matsuoka ............. B60K 35/00
382/100
(Continued)

FOREIGN PATENT DOCUMENTS

JP H07-55941 A 3/1995
JP 2008-97278 4/2008
(Continued)

OTHER PUBLICATIONS

S. Lee, J. Jo, H. Jung, K. Park and J. Kim, "Real-Time Gaze Estimator Based on Driver's Head Orientation for Forward Collision Warning System," In. Proc. IEEE Transactions on Intelligent Transportation Systems, vol. 12, No. 1, Mar. 2011, pp. 254-267 (Year: 2011).*

*Primary Examiner* — Peter D Nolan
(74) *Attorney, Agent, or Firm* — Brinks Gilson & Lione

(57) ABSTRACT

A vehicle chooses a target vehicle based on a position of a preceding vehicle and information about a visual line of a driver, both of which are acquired by respective detection units provided in the vehicle, and controls a traveling speed of the vehicle of the driver in relation with the target vehicle. The vehicle includes: a preceding-vehicle detection unit to detect other vehicle located in front of the vehicle of a driver to acquire a position of the other vehicle; a driver visual line detection unit to acquire information about a visual line of the driver; and a control unit to choose a target vehicle based on the information of the other vehicle and the information about the visual line of the driver and control a traveling speed of the vehicle which the driver drives such that an inter-vehicle distance from the target vehicle becomes a preset distance.

21 Claims, 18 Drawing Sheets

(52) U.S. Cl.
CPC ... *B60W 2540/00* (2013.01); *B60W 2550/302* (2013.01); *B60W 2550/306* (2013.01); *B60W 2720/10* (2013.01)

(56) References Cited

U.S. PATENT DOCUMENTS

| | | | | |
|---|---|---|---|---|
| 8,489,252 | B2 * | 7/2013 | Inou | A61B 5/18 701/1 |
| 8,493,199 | B2 * | 7/2013 | Koehler | B62D 15/0285 180/272 |
| 9,753,459 | B2 * | 9/2017 | Mueller | G05D 1/0088 |
| 2004/0239509 | A1 * | 12/2004 | Kisacanin | A61B 5/18 340/575 |
| 2007/0089054 | A1 * | 4/2007 | Morimoto | B60Q 9/00 715/700 |
| 2009/0022368 | A1 * | 1/2009 | Matsuoka | B60K 35/00 382/103 |
| 2011/0025836 | A1 * | 2/2011 | Tamaki | B60R 11/04 348/78 |
| 2011/0148613 | A1 * | 6/2011 | Koehler | B62D 15/0285 340/438 |
| 2012/0046803 | A1 * | 2/2012 | Inou | A61B 5/18 701/1 |
| 2014/0204193 | A1 * | 7/2014 | Zhang | G06K 9/00597 348/78 |
| 2016/0001781 | A1 * | 1/2016 | Fung | G06F 19/345 701/36 |
| 2016/0170413 | A1 * | 6/2016 | Mueller | G05D 1/0088 701/23 |

FOREIGN PATENT DOCUMENTS

| | | |
|---|---|---|
| JP | 2008-305283 | 12/2008 |
| JP | 2010-76616 | 4/2010 |
| JP | 2011-204053 | 10/2011 |
| JP | 2015-085719 A | 5/2015 |

* cited by examiner

VEHICLE AND METHOD FOR CONTROLLING THE SAME

CROSS-REFERENCE TO RELATED APPLICATION

This application claims the benefit of Korean Patent Application No. 10-2015-0123965, filed on Sep. 2, 2015, which is incorporated herein by reference in its entirety.

FIELD

The present disclosure relates to a vehicle and a method for controlling the same, and more particularly, to a vehicle that chooses a target vehicle based on information about a position of a preceding vehicle and information about a visual line of a driver.

BACKGROUND

The statements in this section merely provide background information related to the present disclosure and may not constitute prior art.

Vehicles refer to machines that can convey people or cargo to a destination while running on a road or a track. The vehicles can move to various sites using at least one wheel that is mostly installed on a body. These vehicles may be classified into three- or four-wheeled vehicles, two-wheeled vehicles such as motorcycles, construction vehicles, bicycles, and railed vehicles running on rails laid on a track.

An inter-vehicle distance control system for controlling a distance from other vehicles ahead or behind during traveling of a vehicle realizes control of detecting the other vehicles to increase or reduce a traveling speed in order to maintain a steady inter-vehicle distance.

Generally, this inter-vehicle distance control system generates information about an arbitrary lane on a lane along which a driver drives a vehicle, or controls the traveling speed to adjust the distance from the other vehicles ahead or behind only when the other vehicles are detected over a preset time.

Therefore, in relation with another vehicle that abruptly enters a lane along which a driver drives a vehicle, a point in time when the other vehicle is chosen as a target vehicle to adjust an inter-vehicle distance is delayed. Thus, a deceleration point is delayed, and sharp deceleration occurs.

Further, in relation with another vehicle that slowly deviates from a lane along which a driver drives a vehicle, the vehicle of the driver is decelerated until the other vehicle completely deviates, and unintended deceleration occurs.

In recent years, studies for rapidly accurately choosing the target vehicle required to control the inter-vehicle distance in relation with the vehicle which the driver drives have been actively made.

SUMMARY

Forms of the present disclosure prevent undesired acceleration or deceleration generated from a vehicle of a driver by choosing a target vehicle based on information about a position of a preceding vehicle and information about a visual line of the driver, both of which are acquired by respective detection units mounted in the vehicle, and controlling a traveling speed of the vehicle of the driver in relation with the target vehicle.

Additional aspects of the present disclosure will be set forth in part in the description which follows and, in part, will be obvious from the description, or may be learned by practice of the present disclosure.

In accordance with an aspect of the present disclosure, a vehicle includes: a preceding-vehicle detection unit configured to detect at least one other vehicle located in front of the vehicle of a driver to acquire information about a position of the at least one other vehicle; a driver visual line detection unit configured to acquire information about a visual line of the driver; and a control unit configured to choose a target vehicle based on the information about the position of the at least one other vehicle which is acquired by the preceding-vehicle detection unit and the information about the visual line of the driver which is acquired by the driver visual line detection unit and control a traveling speed of the vehicle which the driver drives such that an inter-vehicle distance from the target vehicle becomes a preset distance.

Here, the preceding-vehicle detection unit may detect the other vehicle located in front of the same lane as the vehicle which the driver drives, the other vehicle entering the lane, and the other vehicle deviating from the lane.

Further, the preceding-vehicle detection unit may detect an angle between the vehicle which the driver drives and the other vehicle and a distance at which the other vehicle is located to acquire the information about the position of the other vehicle.

Further, the driver visual line detection unit may detect an angle of a direction in which a face of the driver is directed or an angle of a direction in which pupils of the driver look to acquire the information about the visual line of the driver.

Also, the control unit may compare an angle between the vehicle of the driver and the other vehicle which is acquired by the preceding-vehicle detection unit with an angle of a direction in which a face of the driver is directed, the angle of the direction in which the face of the driver is directed being acquired by the driver visual line detection unit.

Further, the control unit may compare an angle between the vehicle of the driver and the other vehicle which is acquired by the preceding-vehicle detection unit with an angle of a direction in which pupils of the driver look, the angle of the direction in which the pupils of the driver look being acquired by the driver visual line detection unit.

When an angle between the vehicle of the driver and the other vehicle is matched with an angle of a direction in which a face of the driver is directed, the control unit may choose the other vehicle as the target vehicle.

When an angle between the vehicle of the driver and the other vehicle is matched with an angle of a direction in which pupils of the driver look, the control unit may choose the other vehicle as the target vehicle.

Further, the control unit may control the traveling speed of the vehicle of the driver such that a distance between the vehicle of the driver and the target vehicle which is acquired by the preceding-vehicle detection unit becomes a preset distance.

Also, the control unit may reduce the traveling speed of the vehicle of the driver when a distance between the vehicle of the driver and the target vehicle is less than a preset distance, and increase the traveling speed of the vehicle of the driver when a distance between the vehicle of the driver and the target vehicle is equal to or more than a preset distance.

In addition, the vehicle may further include a storage unit configured to store the information about the position of the other vehicle which is acquired by the preceding-vehicle detection unit, the information about the visual line of the driver which is acquired by the driver visual line detection unit, and the inter-vehicle distance between the vehicle of the driver and the other vehicle.

In accordance with another aspect of the present disclosure, a method for controlling a vehicle includes: detecting at least one other vehicle located in front of the vehicle of a driver to acquire information about a position of the at least one other vehicle; acquiring information about a visual line of the driver; choosing a target vehicle based on the acquired information about the position of the at least one other vehicle and the acquired information about the visual line of the driver; and controlling a traveling speed of the vehicle of the driver such that an inter-vehicle distance from the target vehicle becomes a preset distance.

Here, the acquiring of the information about the position of the other vehicle may include recognizing the other vehicle located in front of the same lane as the vehicle which the driver drives, the other vehicle entering the lane, and the other vehicle deviating from the lane.

Further, the acquiring of the information about the position of the other vehicle may include detecting an angle between the vehicle which the driver drives and the other vehicle and a distance at which the other vehicle is located.

Also, the acquiring of the information about the visual line of the driver may include detecting an angle of a direction in which a face of the driver is directed or an angle of a direction in which pupils of the driver look.

Further, the choosing of the target vehicle may include comparing an acquired angle between the vehicle of the driver and the other vehicle with an acquired angle of a direction in which a face of the driver is directed.

Further, the choosing of the target vehicle may include comparing an acquired angle between the vehicle of the driver and the other vehicle with an acquired angle of a direction in which pupils of the driver look.

Further, the choosing of the target vehicle may include choosing the other vehicle as the target vehicle when an angle between the vehicle of the driver and the other vehicle is matched with an angle of a direction in which a face of the driver is directed.

In addition, the choosing of the target vehicle may include choosing the other vehicle as the target vehicle when an angle between the vehicle of the driver and the other vehicle is matched with an angle of a direction in which pupils of the driver look.

Further, the controlling of the traveling speed of the vehicle of the driver may include controlling the traveling speed of the vehicle of the driver such that an acquired distance between the vehicle of the driver and the target vehicle becomes a preset distance.

In addition, the controlling of the traveling speed of the vehicle of the driver may include: reducing the traveling speed of the vehicle of the driver when a distance between the vehicle of the driver and the target vehicle is less than a preset distance; and increasing the traveling speed of the vehicle of the driver when a distance between the vehicle of the driver and the target vehicle is equal to or more than a preset distance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
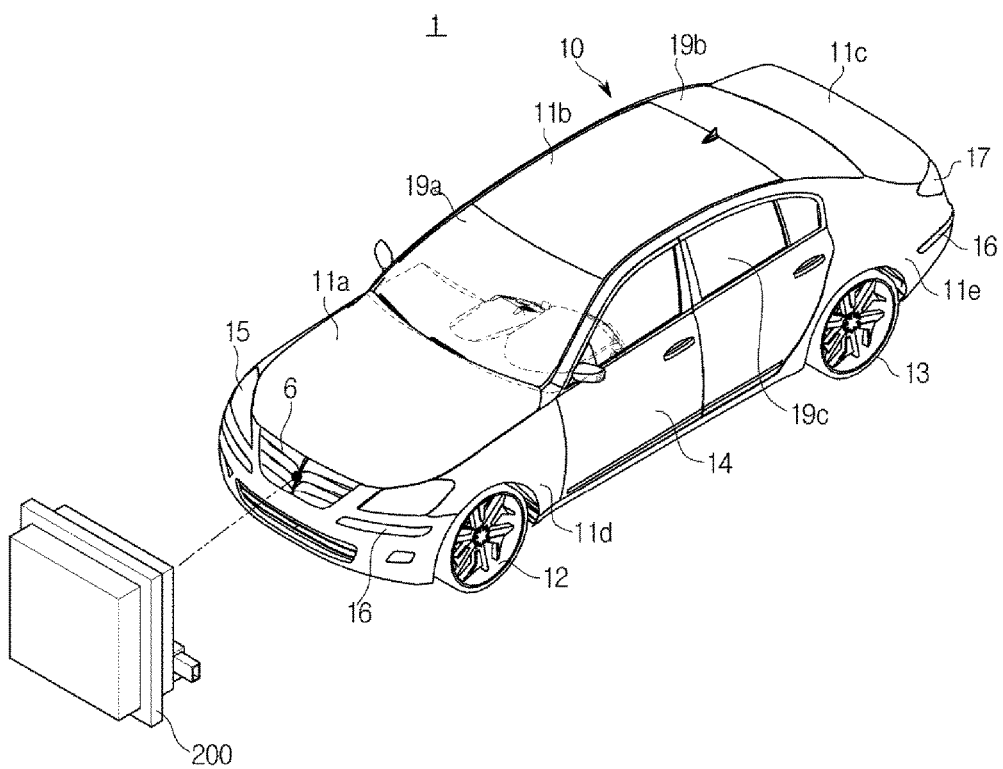
FIG. 1 is a perspective view schematically illustrating an appearance of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, when a certain portion "includes" a certain component, this indicates that the other components are not excluded, but may be further included unless otherwise noted. The terms "unit", "-or/er" and "module" described in the specification indicate a unit for processing at least one function or operation, which may be implemented by hardware, software or a combination thereof.

The forms of the present disclosure will be described below in detail with reference to the accompanying drawings such that those of ordinary skill in the art can understand and reproduce the present disclosure. However, in the description of the present disclosure, when it is determined that the detailed description of the related well-known functions or configurations would obscure the gist of the present disclosure, the description thereof will be omitted.

The technical terms, as will be mentioned below, are terms defined in consideration of their functions in the present disclosure, meanings of which may be varied according to the intention or practices of a user or an operator. If specifically defined below, the meanings of the terms follow the definitions. Without the specific definitions, the meanings of the terms should be interpreted as meanings generally recognized to those skilled in the art.

In addition, although the configurations of the selectively described aspect or form are illustrated in the drawings as a single combined configuration, unless otherwise described, it should be understood that they can be freely combined if it is not apparent to the those skilled in the art that they are technically inconsistent.

FIG. 1 is a perspective view schematically illustrating an appearance of a vehicle.

Referring to FIG. 1, the vehicle 1 may include a body 10 forming an appearance thereof, and wheels 12 and 13 moving the vehicle 1.

The body 10 may include a hood 11a that protects various systems such as an engine required to drive the vehicle 1, a roof panel 11b that forms an indoor space, a trunk lid 11c under which a storage space is formed, and front fenders 11d and back fenders 11e that are provided at sides of the vehicle 1. Further, sides of the body 11 may be provided with a plurality of doors 14 hinged to the body.

A front window 19a enabling a driver to secure a forward field of vision in a forward direction of the vehicle 1 may be installed between the hood 11a and the roof panel 11b, and a rear window 19b enabling the driver to secure a backward field of vision in a backward direction of the vehicle 1 may be installed between the roof panel 11b and the trunk lid 11c. Further, side windows 19c enabling the driver to secure a lateral field of vision in lateral directions of the vehicle 1 may be installed at upper sides of the doors 14.

Further, headlamps 15 emitting light in a moving direction of the vehicle 1 may be provided at the front of the vehicle 1.

Also, turn signal lamps 16 for indicating the moving direction of the vehicle 1 may be provided at the front and rear of the vehicle 1.

The vehicle 1 may indicate the moving direction by turning on and off the turn signal lamps 16. Further, tail lamps 17 may be provided at the rear of the vehicle 1. The tail lamps 17 provided at the rear of the vehicle 1 may indicate a shifted state, a braked state, etc. of the vehicle 1.

The vehicle 1 may be provided with a preceding-vehicle detection unit 200 that detects at least one other vehicle located in front of the vehicle to acquire information about a position of the other vehicle. The preceding-vehicle detection unit 200 may be installed at a part, for instance at an inner side, of a radiator grill 6. However, the preceding-vehicle detection unit 200 may be installed at any position of the vehicle 1 as long as it can detect the vehicles ahead.

Figure 2:
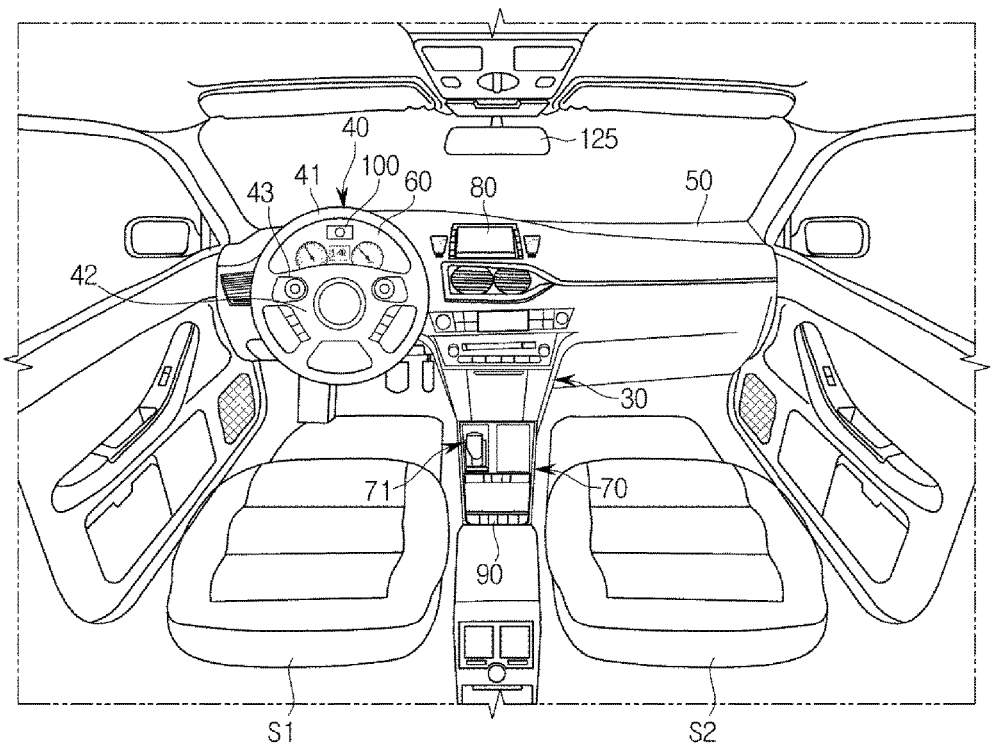
FIG. 2 is a perspective view schematically illustrating an interior of the vehicle.

FIG. 2 is a perspective view schematically illustrating an interior of the vehicle.

Referring to FIG. 2, an interior of the vehicle 1 is provided with a plurality of seats S1 and S2 which a driver and a passenger take, and a dashboard 50 in which various instruments required for driving are mounted in front of the seats S1 and S2.

The dashboard 50 is provided with a steering wheel 40 for controlling a traveling direction of the vehicle 1. The steering wheel 40 is a device for steering the vehicle, and may include a rim 41 grasped by the driver and a spoke 42 connecting the rim and a rotating shaft for steering. Further, if necessary, the steering wheel 40 may further include an operating device 43 for operating a convenience device.

Further, the dashboard 50 may further include an instrument panel 60 that displays information about traveling conditions of the vehicle 1 and operation of each component. The instrument panel 60 can provide the driver with various pieces of information associated with the vehicle, such as a speed of the vehicle 1, an engine revolutions-per-minute (RPM), a level of fuel, a temperature of engine oil, whether the turn signal lamp is turned on and off, a vehicle movement distance, and so on. The instrument panel 60 may be implemented using lamps, dial plates, and so on, or using a display panel as needed. When the instrument panel 60 is implemented using the display panel, the instrument panel 60 can provide the driver with more various pieces of information such as whether various functions mounted in the vehicle 1 are performed in addition to the aforementioned information. A position of the instrument panel 60 has no limitation, but may be at the back of the steering wheel 40 in consideration of visibility of the driver.

Further, the instrument panel 60 may be provided with a driver visual line detection unit 100 for acquiring information about a visual line of the driver. The driver visual line detection unit 100 may acquire the information about the visual line of the driver by detecting at least one of angles of a face and pupils of the driver who drives the vehicle 1, and transmit the acquired information about the visual line of the driver to a control unit 300. The driver visual line detection unit 100 is provided for the instrument panel 60. However, there is no limitation on a position at which the driver visual line detection unit 100 can be installed. The driver visual line detection unit 100 may be installed at any position of the vehicle 1 as long as it can acquire the information about the visual line of the driver.

Meanwhile, a center fascia 30 for controlling various devices installed in the vehicle 1 may be provided in the middle of the dashboard 50. A center console 70 may be provided between the center fascia 30 and an armrest 90. The center console 70 may be provided with a gearshift 71 for operating gears of the vehicle 1.

The dashboard 50 may further include a display device 80. The display device 80 may be provided between the center fascia 30 and the steering wheel 40 on the dashboard 50, but a position thereof is not limited to this. The display device 80 may display information about various convenience devices installed in the vehicle 1 as well as information about driving of the vehicle 1. The display device 80 may display information associated with user interfaces for controlling the various convenience devices of the vehicle 1 and an audio video navigation (AVN) system. The display device 80 may be implemented by a touch screen panel (TSP) in which a touch recognition means for recognizing a touch of a user is further included. The user can control various convenience functions by touching the display device 80.

This TSP included in the display device 80 may be implemented by a means such as a plasma display panel (PDP), a liquid crystal display (LCD) panel, a light emitting diode (LED) panel, an organic light emitting diode (OLED) panel, an active matrix organic light emitting diode (AMO-LED) panel, or the like, but it is not limited to this.

Figure 3:
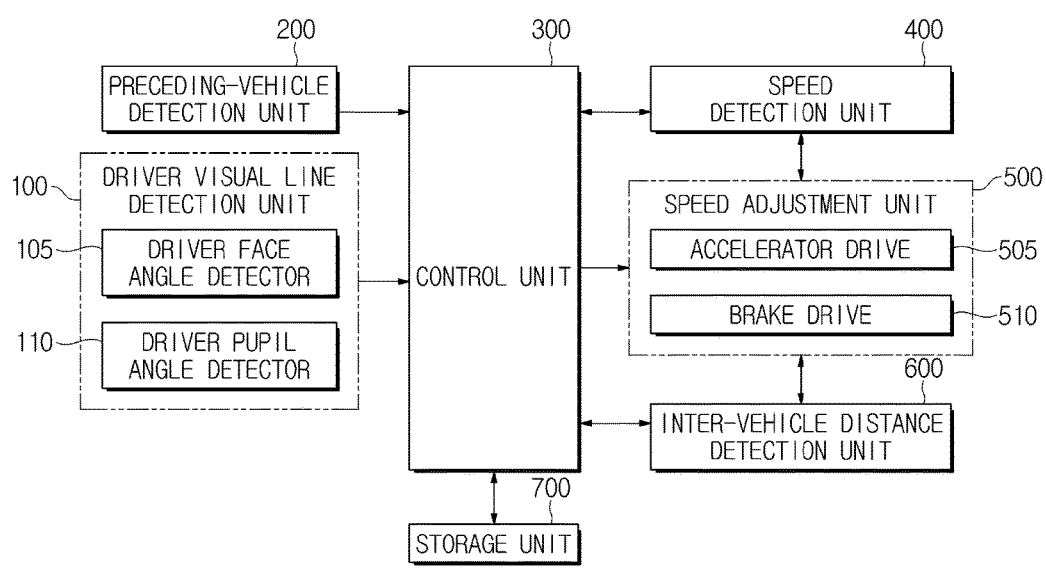
FIG. 3 is a control block diagram of the vehicle.

FIG. 3 is a control block diagram of the vehicle.

Referring to FIG. 3, the vehicle 1 may include a speed detection unit 400, a speed adjustment unit 500, an inter-vehicle distance detection unit 600, and a storage unit 700 in addition to the driver visual line detection unit 100, the preceding-vehicle detection unit 200, and the control unit 300.

The driver visual line detection unit 100 may include a driver face angle detector 105 and a driver pupil angle detector 110.

The driver visual line detection unit 100 may acquire the information about the visual line of the driver who drives the vehicle 1. To be specific, the driver face angle detector 105 may detect an angle of a direction in which the face of the driver is directed, and the driver pupil angle detector 110 may detect an angle of a direction in which the pupils of the driver look. The driver visual line detection unit 100 may be provided with a camera that acquires an image of the face of the driver and may be installed at a position at which the information about the visual line of the driver can be acquired by recording a front face of the driver. Here, a case in which the driver visual line detection unit 100 is provided for the instrument panel 60 will be described by way of example.

It is possible to detect a position of an eyeball of the driver from the face image acquired through the camera with which the driver visual line detection unit 100 is provided, and an angle of the visual line direction in which the pupils of the driver look based on the detected position of the eyeball. Further, it is possible to detect a direction in which a head of the driver including the face is directed and to acquire the information about the visual line of the driver based on the angle at which the face of the driver is directed. The "visual line direction" of the driver refers to a leftward or rightward direction in which the visual line of the driver is directed. The driver visual line detection unit 100 is installed on the instrument panel 60, faces the driver, and can acquire the information about the visual line of the driver. The driver visual line detection unit 100 may include a plurality of visual line sensors. The plurality of visual line sensors may be located inside or outside the vehicle 1, and be used to accurately acquire the information about the visual line of the driver.

While driving the vehicle 1, the driver can turn his/her head to look at a specific point, or turn his/her eyes to look at a specific point with his/her head fixed. When the driver turns his/her head to look at the specific point, the information about the angle of the direction in which the face of the driver is directed, i.e. the information acquired by the driver face angle detector 105, can be used. When the driver turns his/her eyes to look at the specific point with his/her head fixed, the information about the angle of the direction in which the pupils of the driver look, i.e. the information acquired by the driver pupil angle detector 110, can be used. Further, it goes without saying that both the information about the angle of the direction in which the face of the driver is directed and the information about the angle of the direction in which the pupils of the driver look can be used.

The driver visual line detection unit 100 may transmit the acquired information about the visual line of the driver to the control unit 300.

The preceding-vehicle detection unit 200 may detect at least one other vehicle located ahead of the vehicle 1 which the driver drives to acquire information about a position of the detected vehicle. The other vehicle located ahead of the vehicle 1 which the driver drives may include a vehicle located ahead on the same lane, a vehicle entering a lane on which the vehicle of the driver is located from a neighboring lane, or a vehicle deviating from the lane on which the vehicle of the driver is located. The preceding-vehicle detection unit 200 may detect these plurality of vehicles.

The preceding-vehicle detection unit 200 may detect an angle between the vehicle which the driver drives and the other vehicle and a distance from the other vehicle to acquire information about a position of the other vehicle. That is, it is possible to detect at which angle and in which direction the preceding other vehicle on the basis of the vehicle which the driver drives is located and simultaneously how much the other vehicle is distant.

As illustrated in FIG. 1, the preceding-vehicle detection unit 200 may be installed in a front part of the vehicle 1 so as to properly detect a preceding other vehicle. For example, the preceding-vehicle detection unit 200 may be installed on a part of the radiator grill 6, a front bumper, or around a front license plate. An example in which the preceding-vehicle detection unit 200 is installed is described, but a position at which the preceding-vehicle detection unit 200 is installed is not limited to this. In addition to the aforementioned position, the preceding-vehicle detection unit 200 may be installed at various positions which a designer can consider.

Figure 5:
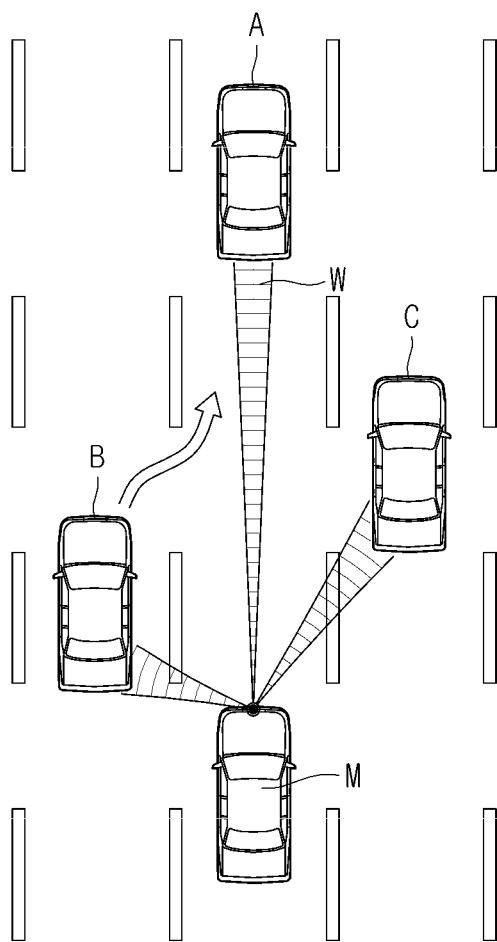
FIG. 5 is a conceptual view illustrating how a preceding-vehicle detection unit acquires information about positions of other vehicles before the other vehicle enters a lane of the vehicle which the driver drives.

The preceding-vehicle detection unit 200 may use an electromagnetic wave or a laser beam to determine whether a preceding object is present or whether to approach the preceding object. In the disclosed present disclosure, the "object" or "another vehicle" will be described as an example. As illustrated in FIG. 5, the preceding-vehicle detection unit 200 emits an electromagnetic wave W such as a microwave or a millimeter wave in a forward direction, and receives the electromagnetic wave reflected from a preceding object, for instance another vehicle A. Thereby, it is possible to determine whether the object such as the other vehicle A is present ahead or whether to approach the object. In this case, the preceding-vehicle detection unit 200 may calculate a distance between a vehicle M which a driver drives and the other vehicle A using a round-trip time of the electromagnetic wave.

The preceding-vehicle detection unit 200 may emit a pulse laser beam, an ultrasonic wave, or an infrared ray in a forward direction, and receive the pulse laser beam, the ultrasonic wave, or the infrared ray reflected or scattered from the other preceding vehicle. Thereby, it is possible to determine whether the other vehicle is present. Further, the preceding-vehicle detection unit 200 may receive a visible ray reflected or scattered from the other preceding vehicle, and determine whether the other vehicle is present.

Depending on which of the electromagnetic wave W, the pulse laser beam, the ultrasonic wave, the infrared ray, and the visible ray is used, the preceding-vehicle detection unit 200 may be influenced by a detection distance from the other preceding vehicle or a weather or illuminance in detecting the other vehicle.

The preceding-vehicle detection unit 200 may transmit information about a position of the detected other vehicle to the control unit 300. When the vehicle of the driver runs along a lane in this way, the control unit 300 may determine whether another vehicle running along the same lane in front of the vehicle of the driver is present, whether the vehicle of the driver approaches the other vehicle, or a distance from the other vehicle.

The preceding-vehicle detection unit 200 may be implemented using, for instance, a radar using millimeter waves or microwaves, a light detection and ranging (Lidar) using pulse laser beams, a vision using visible rays, an infrared sensor using infrared rays, or an ultrasonic sensor using ultrasonic waves. The preceding-vehicle detection unit 200 may be implemented using only any one of them, or a combination of them.

The control unit 300 may choose a target vehicle based on the information about the position of the other vehicle which is acquired by the preceding-vehicle detection unit 200 and the information about the visual line of the driver which is acquired by the driver visual line detection unit 100, and control a traveling speed of the vehicle which the driver drives such that the distance from the target vehicle becomes a preset distance.

That is, the control unit 300 may receive the information about the position of the other vehicle which is acquired by the preceding-vehicle detection unit 200 and the information about the visual line of the driver which is acquired by the driver visual line detection unit 100.

The control unit 300 may choose the target vehicle to control the distance from the vehicle which the drivers drives based on the received information. To be specific, when the control unit 300 receives the information about the angle of the direction in which the face of the driver is directed from the driver face angle detector 105, the control unit 300 may compare the angle of the direction in which the face of the driver is directed with the angle that is formed between the vehicle of the driver and the other vehicle and is received from the preceding-vehicle detection unit 200. Further, when the control unit 300 receives the information about the angle of the direction in which the pupils of the driver look from the driver pupil angle detector 110, the control unit 300 may compare the angle of the direction in which the pupils of the driver look with the angle that is formed between the vehicle of the driver and the other vehicle and is received from the preceding-vehicle detection unit 200.

When the angle of the direction in which the face of the driver is directed is matched with the angle between the vehicle of the driver and the other vehicle, the control unit 300 may choose the other vehicle at which the driver looks as the target vehicle. Further, when the angle of the direction in which the pupils of the driver look is matched with the angle between the vehicle of the driver and the other vehicle, the control unit 300 may choose the other vehicle at which the driver looks as the target vehicle.

Furthermore, when the target vehicle is chosen, the control unit 300 may control the traveling speed of the vehicle 1 which the driver drives such that the inter-vehicle distance between the vehicle 1 which the driver drives and the target vehicle becomes a preset distance. That is, when the distance between the vehicle 1 of the driver and the target vehicle is less than the preset distance, the control unit 300 may reduce the traveling speed of the vehicle 1 of the driver. When the distance between the vehicle 1 of the driver and the target vehicle is equal to or more than the preset distance, the control unit 300 may increase the traveling speed of the vehicle 1 of the driver.

At this time, the preset distance between the vehicle 1 of the driver and the target vehicle refers to a distance that is preset to secure a safety distance during the traveling of the vehicle and is stored in the storage unit 700.

To control the traveling speed of the vehicle 1 which the driver drives, the control unit 300 may control the speed detection unit 400, the speed adjustment unit 500, and the inter-vehicle distance detection unit 600.

The control unit 300 may be implemented in an array of numerous logic gates, or by a combination of a general-purpose microprocessor and a memory in which a program executable in the general-purpose microprocessor is stored.

The speed detection unit 400 may detect the traveling speed of the vehicle 1 which the driver drives under the control of the control unit 300. To be specific, the traveling speed may be detected using a speed at which the wheels of the vehicle 1 rotate. A unit of the traveling speed may be expressed by [kph] or a traveling distance (km) per unit hour (h).

The inter-vehicle distance detection unit 600 may detect the distance between the vehicle 1 which the driver drives and the target vehicle under the control of the control unit 300. As described above, the preceding-vehicle detection unit 200 may detect a distance from the other vehicle in front of the vehicle 1 which the driver drives, and the inter-vehicle distance detection unit 600 may detect a distance from the target vehicle to adjust the inter-vehicle distance between the vehicle 1 of the driver and the target vehicle after the target vehicle is chosen.

The speed adjustment unit 500 may adjust the speed of the vehicle 1 which the driver drives. The speed adjustment unit 500 may include an accelerator drive 505 and a brake drive 510.

The accelerator drive 505 may receive a control signal of the control unit 300 to drive an accelerator to increase the speed of the vehicle 1. The brake drive 510 may receive the control signal of the control unit 300 to operate a brake to reduce the speed of the vehicle 1. When the distance from the target vehicle is less than the preset distance, the control unit 300 may reduce the traveling speed of the vehicle 1 based on the inter-vehicle distance from the target vehicle which the inter-vehicle distance detection unit 600 detects and a preset reference distance stored in the storage unit 700 such that the detected inter-vehicle distance is increased. In contrast, when the distance from the target vehicle is equal to or more than the preset distance, the control unit 300 may increase the traveling speed of the vehicle 1 such that the detected inter-vehicle distance is reduced.

The storage unit 700 may store the information about the position of the other vehicle which is acquired by the preceding-vehicle detection unit 200, the information about the visual line of the driver which is acquired by the driver visual line detection unit 100, and the information about the inter-vehicle distance between the vehicle 1 of the driver and the other vehicle. Further, the storage unit 700 may store information about a reference distance that is previously set from the inter-vehicle distance between the vehicle 1 which the driver drives and the target vehicle, and information about the distance that is detected between the vehicle 1 of the driver and the target vehicle by the inter-vehicle distance detection unit 600.

The storage unit 700 may be implemented by, for instance, a non-volatile memory device such as a read only memory (ROM), a programmable read only memory (PROM), an erasable programmable read only memory (EPROM), or a flash memory; a volatile memory device such as a random access memory (RAM), or a storage medium such as a hard disk or an optical disc, but not limited thereto. Further, the storage unit 700 may be attached to or detached from the vehicle 1. For example, the storage unit 700 may include a compact flash (CF) card, a secure digital (SD) card, a smart media (SM) card, a multimedia card (MMC) or a memory stick, but not limited thereto. Furthermore, the storage unit 700 may be provided outside the vehicle 1, and transmit or receive data to or from the vehicle 1 in a wired or wireless manner.

Figure 4A:
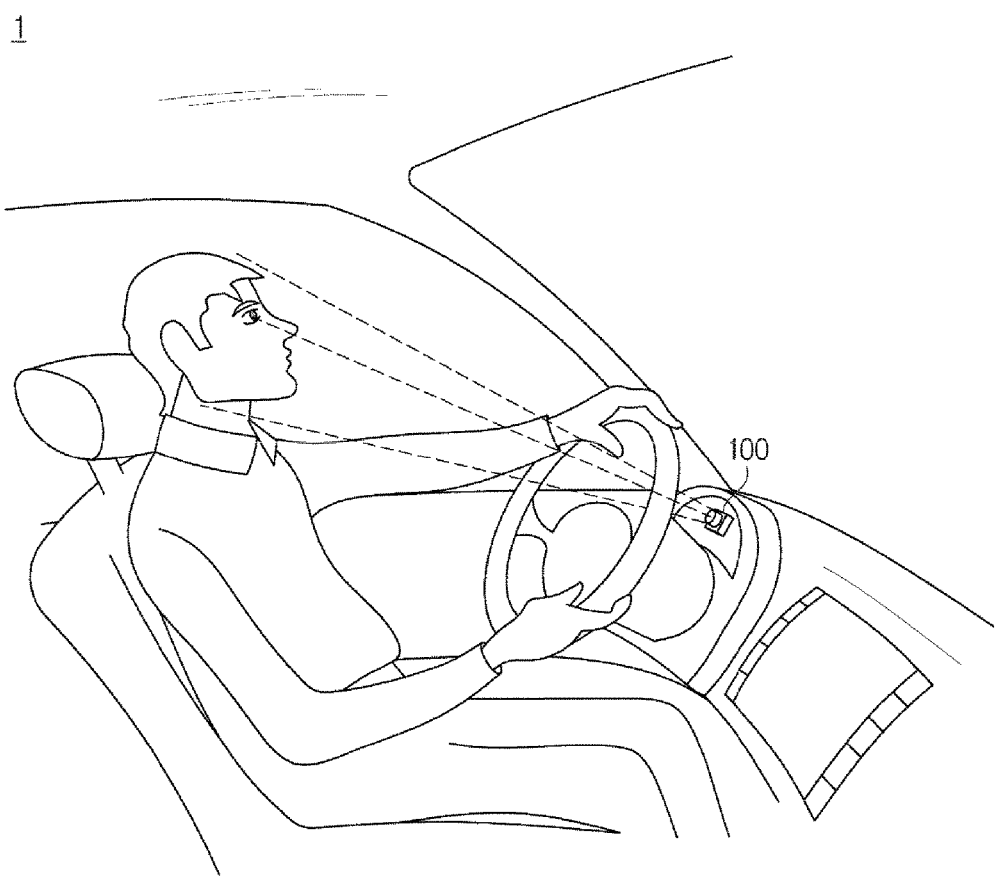
FIG. 4a is a conceptual view for acquiring information about a visual line of a driver.
Figure 4B:
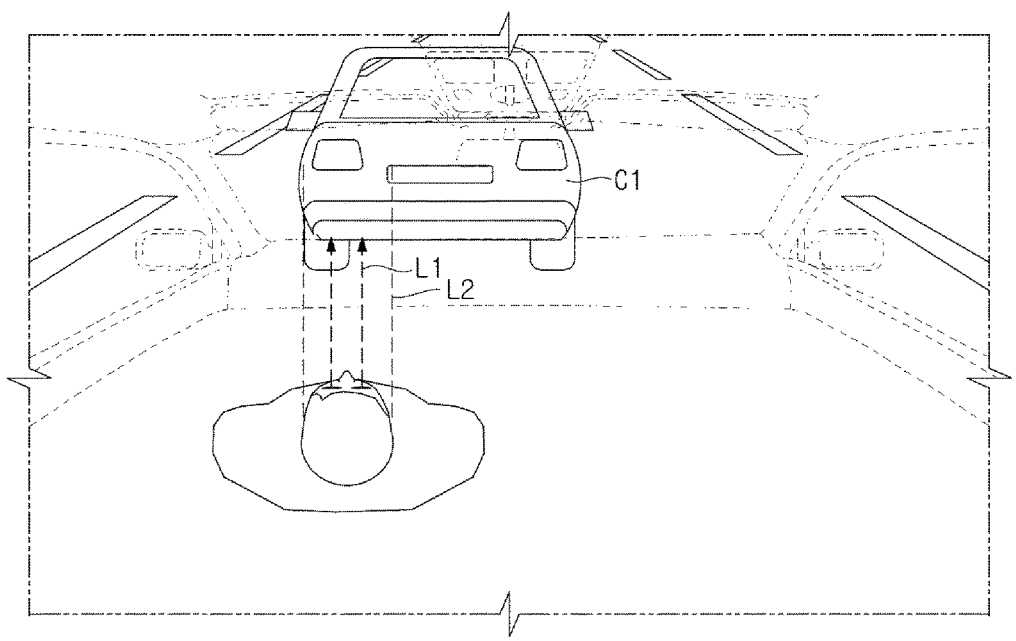
FIGS. 4b and 4c illustrate the visual line of the driver when the driver looks at another preceding vehicle.
Figure 4C:
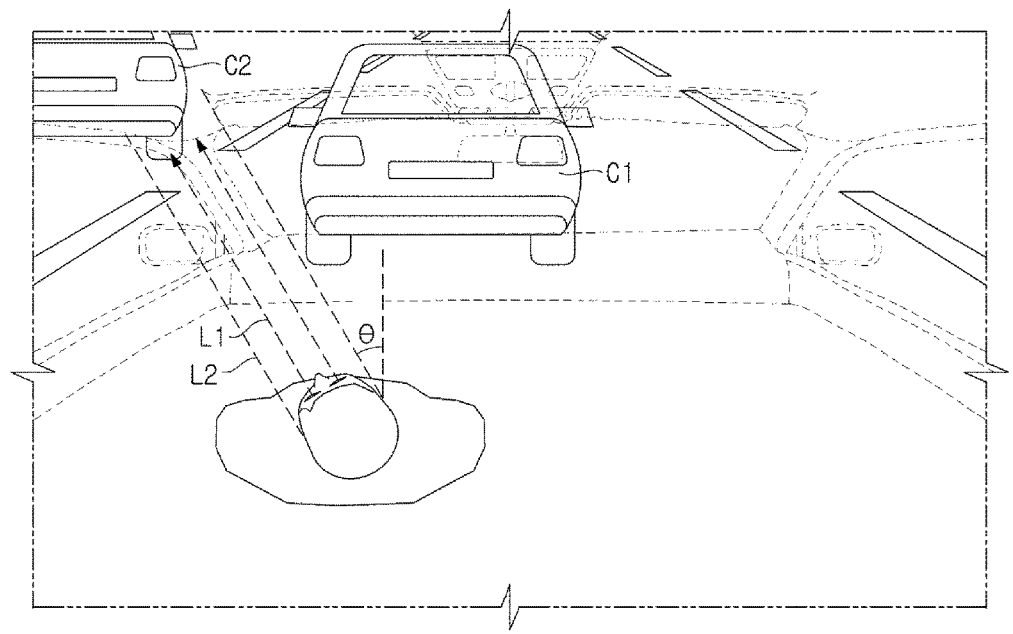

FIG. 4a is a conceptual view for acquiring the information about the visual line of the driver, and FIGS. 4b and 4c illustrate the visual line of the driver when the driver looks at the preceding other vehicle.

As illustrated in FIG. 4a, the driver visual line detection unit 100 may acquire information about the visual line of the driver who drives the vehicle 1. That is, as described above, the driver face angle detector 105 which the driver visual line detection unit 100 includes may detect the angle of the direction in which the face of the driver is directed, and the driver pupil angle detector 110 may detect the angle of the direction in which the pupils of the driver look. The driver visual line detection unit 100 may be provided for the instrument panel 60 of the vehicle 1, and may detect the angle of the visual line direction in which the pupils of the driver look from an image of the face which is acquired through the camera. Further, the driver visual line detection unit 100 may detect the direction in which the face of the driver is directed to acquire the information about the visual line of the driver based on the angle of the direction in which the face of the driver is directed.

The driver may change the visual line in various directions during the driving of the vehicle 1, and the driver visual line detection unit 100 may detect the visual line of the driver in real time, and the direction and angle in and at which the visual line is directed, and transmit the detected information of the visual line to the control unit 300.

FIGS. 4b and 4c are views when a change in the visual line of the driver is viewed from above. Referring to FIG. 4b, the driver who drives the vehicle 1 can look at the other vehicle C1 in front of the same lane as the vehicle 1. At this time, a reference line L1 indicating the visual line of the driver and a reference line L2 indicating the direction in which the face of the driver is directed may face the preceding other vehicle C1.

As described in FIG. 4c, the driver can look at another vehicle C2 located at the next lane during the driving of the vehicle 1. That is, the driver can turn his/her head or avert his/her eyes to look at the other vehicle C2. In this case, the reference line L1 indicating the visual line of the driver and the reference line L2 indicating the direction in which the face of the driver is directed may have a certain angle "θ" with respect to the visual line of the driver who looks at the preceding other vehicle C1.

Therefore, when the visual line of the driver is changed, the driver visual line detection unit 100 may detect at which angle "θ" and in which direction the visual line is changed based on the visual line of the driver who looks at the front. When the driver turns his/her head to look at the other vehicle C2, the driver visual line detection unit 100 may acquire the information about the changed visual line of the driver using at least one of the reference line L1 indicating the visual line of the driver and the reference line L2 indicating the direction in which the face of the driver is directed. Meanwhile, when the driver averts his/her eyes to look at the other vehicle C2 with his/her head fixed, the driver visual line detection unit 100 may acquire the information about the changed visual line of the driver using the reference line L1 indicating the visual line of the driver.

Figure 6:
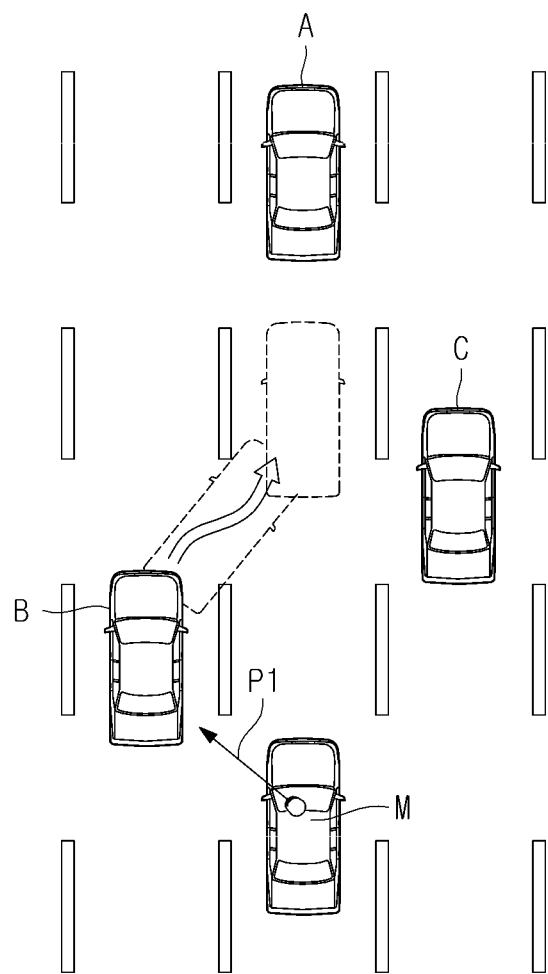
FIG. 6 is a conceptual view illustrating the information about the visual line of the driver who looks at the other vehicle attempting to enter the lane of the vehicle which the driver drives.
Figure 7:
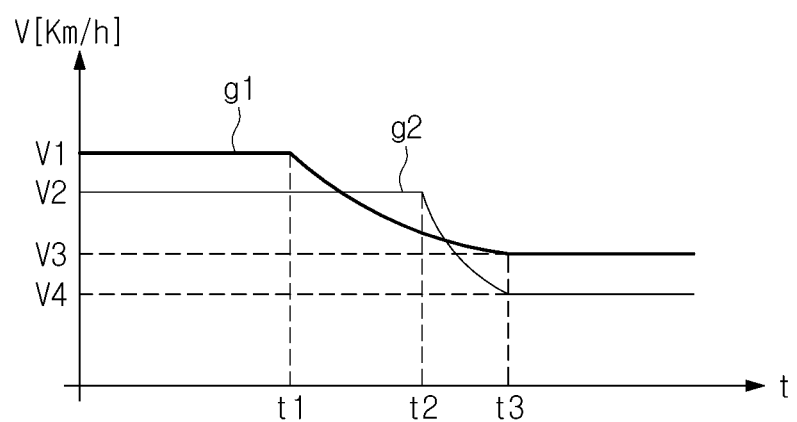
FIG. 7 is a graph illustrating how to control the traveling speed of the vehicle of the driver when the other vehicle enters the lane of the vehicle which the driver drives.

FIG. 5 is a conceptual view illustrating how the preceding-vehicle detection unit acquires information about positions of the other vehicles before the other vehicle enters the lane of the vehicle which the driver drives. FIG. 6 is a conceptual view illustrating the information about the visual line of the driver who looks at the other vehicle attempting to enter the lane of the vehicle which the driver drives. FIG. 7 is a graph illustrating how to control the traveling speed of the vehicle of the driver when the other vehicle enters the lane of the vehicle which the driver drives.

Referring to FIG. 5, a plurality of other vehicles A, B, and C may be present in front of the vehicle M which the driver drives. The preceding-vehicle detection unit 200 included in the vehicle M of the driver may detect the other vehicles A, B, and C to acquire information about positions of the other vehicles.

When the preceding-vehicle detection unit 200 detects the preceding other vehicle A on the same lane as the vehicle M of the driver, the preceding-vehicle detection unit 200 may acquire distance information about how far the other vehicle A is distant from the vehicle M of the driver. Further, when the preceding-vehicle detection unit 200 detects the other vehicles B and C located on lanes other than the lane of the vehicle M of the driver, the preceding-vehicle detection unit 200 may acquire information about at which angle in which direction positions of the other vehicles B and C are distant based on the vehicle M of the driver which travels in a forward direction and distance information about the positions of the other vehicles B and C from the vehicle M of the driver.

The preceding-vehicle detection unit 200 may detect the other vehicles in front of the vehicle M of the driver in real time during the traveling of the vehicle M. As described above, the acquired information about the positions of the other vehicles may be stored in the storage unit 700, and be used to choose the target vehicle.

The detailed method in which the preceding-vehicle detection unit 200 detects the other vehicles A, B, and C to acquire the information about the positions of the other vehicles A, B, and C has been described in FIG. 3, and duplicate description thereof will be omitted.

Referring to FIG. 6, when the other vehicle B located in front of the vehicle M of the driver attempts to enter the same lane as the vehicle M of the driver, the driver can look at the other vehicle B. That is, since the other vehicle B may turn on turn signal lamps or travel in the vicinity of the vehicle M of the driver in order to enter same lane as the vehicle M of the driver, the driver can look at the other vehicle B as soon as this movement of the other vehicle B is captured.

When the driver looks at the other vehicle B attempting to enter the lane of the vehicle M of the driver, the driver visual line detection unit 100 may acquire information about a visual line P1 of the driver, and the acquired information about the visual line P1 of the driver may be stored in the storage unit 700.

The driver visual line detection unit 100 may acquire the information about at which angle in which direction the other vehicle B at which the driver looks is distant from the vehicle M of the driver based on the front of the vehicle M of the driver. The acquired information about the visual line P1 of the driver may be transmitted to the control unit 300 to choose the target vehicle. The detailed method in which the driver visual line detection unit 100 acquires the information about the visual line P1 of the driver has been described above in FIGS. 3 and 4c, and duplicate description thereof will be omitted.

The control unit 300 may choose the target vehicle based on the information about the position of the other vehicle B which is acquired by the preceding-vehicle detection unit 200 and the information about the visual line P1 of the driver which is acquired by the driver visual line detection unit 100.

That is, as described in FIGS. 5 and 6, when the other vehicle B enters the same lane as the vehicle M of the driver according to the disclosed present disclosure, the control unit 300 may compare the information about the position of the other vehicle B and the information about the visual line P1 of the driver. To be specific, the control unit 300 may compare an angle at the position of the other vehicle B which is acquired by the preceding-vehicle detection unit 200 described in FIG. 5 with an angle of the visual line P1 of the driver which is acquired by the driver visual line detection unit 100 described in FIG. 6. At this time, when the driver looks at the other vehicle B entering the lane, the angle of the visual line P1 of the driver may be at least one of the angle at which the face of the driver is directed toward the other vehicle B and the angle at which the pupils of the driver are directed toward the other vehicle B.

Some of the plurality of other vehicles detected by the preceding-vehicle detection unit 200 may have the same angle based on the front of the vehicle M of the driver. In this case, the control unit 300 may give a weight to some of the plurality of vehicles having the same angle in the order in which some of the plurality of vehicles are close to the vehicle M of the driver. Thus, the control unit 300 may use information about a position of the vehicle closest to the vehicle M of the driver as information for choosing the target vehicle based on the given weight.

Referring to FIGS. 5 and 6, with respect to the other vehicle B entering the lane, when the angle of the other vehicle B detected by the preceding-vehicle detection unit 200 is matched with the angle of the visual line P1 of the driver which is detected by the driver visual line detection unit 100, the other vehicle B may be chosen as the target vehicle.

After the other vehicle B is chosen as the target vehicle, when the target vehicle B enters the lane on which the vehicle M of the driver is located, the control unit 300 may control the traveling speed of the vehicle M of the driver in order to control the inter-vehicle distance between the vehicle M of the driver and the target vehicle B.

That is, the control unit 300 may control the speed adjustment unit 500 based on the distance between the vehicle M of the driver and the target vehicle B which is detected by the inter-vehicle distance detection unit 600 and the traveling speed of the vehicle M of the driver which is detected by the speed detection unit 400. The control unit 300 may reduce the traveling speed of the vehicle M of the driver based on the information about the reference distance between the vehicle M of the driver and the target vehicle B which is pre-stored in the storage unit 700 if the distance between the vehicle M of the driver and the target vehicle B which is detected by the inter-vehicle distance detection unit 600 is less than the reference distance. In contrast, if the distance between the vehicle M of the driver and the target vehicle B which is detected by the inter-vehicle distance detection unit 600 is equal to or more than the reference distance, the control unit 300 may increase the traveling speed of the vehicle M of the driver. At this time, the information about the reference distance pre-stored in the storage unit 700 may include information about a minimum safety distance that should be maintained between the vehicles. The detailed method in which the control unit 300 controls the traveling speed of the vehicle M of the driver has been described above in FIG. 3, and duplicate description thereof will be omitted.

Referring to FIG. 7, a speed-time graph with which the control unit 300 controls the traveling speed of the vehicle M of the driver in order to control the inter-vehicle distance between the vehicle M of the driver and the target vehicle may be plotted in the form of a line g2 in the related art, the information about the visual line of the driver is not considered when the target vehicle is chosen, and it is not until the other vehicle enters the lane on which the vehicle M of the driver is located and is detected for a predetermined time that the other vehicle is recognized as the target vehicle and the traveling speed of the vehicle M of the driver is controlled. Thus, there is a problem that the vehicle M which the driver drives abruptly reduces the traveling speed.

As illustrated in FIG. 7, when the other vehicle B enters the lane of the vehicle M of the driver while the vehicle M of the driver is traveling at an initial traveling speed V2, the vehicle M of the driver detects the other vehicle at that point of time t2, and sharply reduces the traveling speed to maintain an inter-vehicle distance from the other vehicle B. When the traveling speed is reduced to V4 and a predetermined distance from the other vehicle B is secured, the vehicle M of the driver travels at the reduced traveling speed V4.

In contrast, in a method for controlling a vehicle according to the disclosed present disclosure, a speed-time graph with which the control unit 300 controls the traveling speed of the vehicle M of the driver may be plotted in the form of a line g1.

The information about the position of the other vehicle B which is acquired by the preceding-vehicle detection unit 200 and the information about the visual line P1 of the driver which is acquired by the driver visual line detection unit 100 are compared. When an angle at which the other vehicle B is located is matched with an angle at which the driver looks, the other vehicle B may be chosen as the target vehicle even before the other vehicle B enters the lane of the vehicle M of the driver.

As illustrated in FIG. 7, the control unit 300 may control the traveling speed of the vehicle M of the driver from a point of time t1 when the other vehicle B is chosen as the target vehicle B in order to control the inter-vehicle distance. That is, the vehicle M of the driver may begin to be decelerated from the point of time t1 before the target vehicle B enters the lane of the vehicle M of the driver, and be decelerated until the target vehicle B enters the lane of the vehicle M of the driver and the inter-vehicle distance from the vehicle M of the driver is equal to or more than a preset distance. Therefore, the vehicle M of the driver may travel at a latter speed V3 after the vehicle M of the driver is decelerated from the initial speed V1.

In this way, due to the vehicle control according to the disclosed present disclosure, the vehicle M of the driver is decelerated from the point of time t1 earlier than the point of time t2 when the other vehicle B enters the lane of the vehicle M of the driver. Thereby, it is possible to reduce or prevent abrupt deceleration and unnecessary deceleration.

Figure 8:
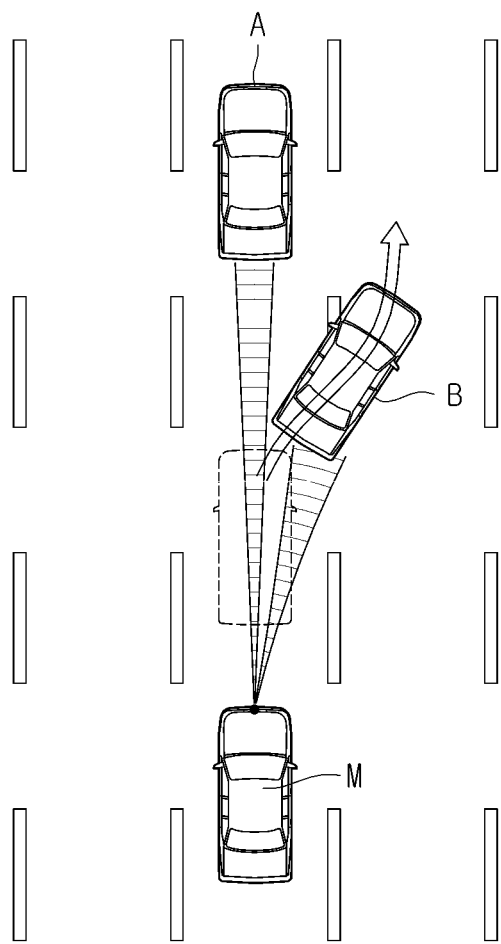
FIG. 8 is a conceptual view illustrating how the preceding-vehicle detection unit acquires information about positions of other vehicles when the other vehicle deviates from the lane of the vehicle which the driver drives.
Figure 9:
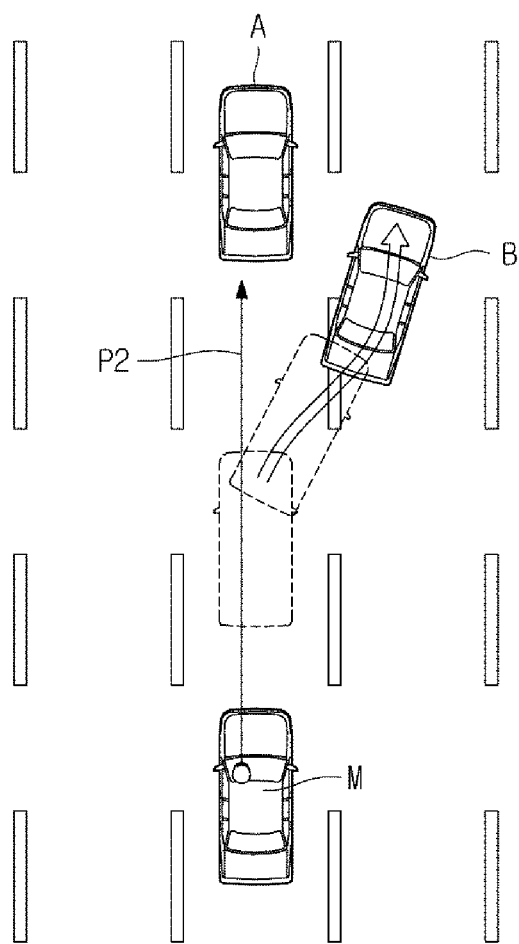
FIG. 9 is a conceptual view illustrating how the visual line of the driver is changed when the other vehicle deviates from the lane of the vehicle which the driver drives.
Figure 10:
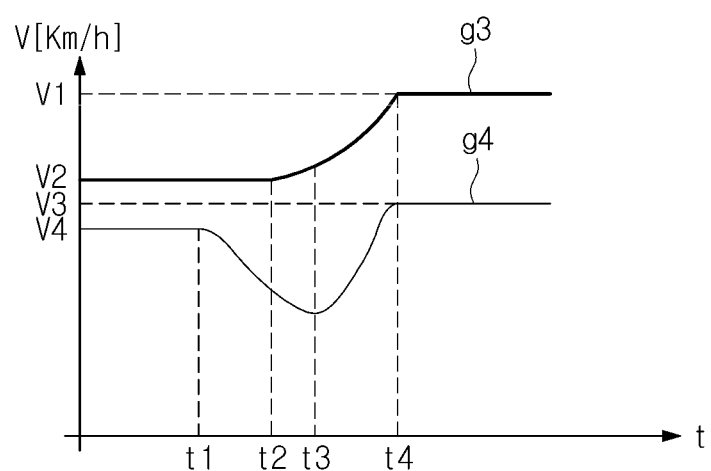
FIG. 10 is a graph plotting how to control the traveling speed of the vehicle of the driver when the other vehicle deviates from the lane of the vehicle which the driver drives.

FIG. 8 is a conceptual view illustrating how the preceding-vehicle detection unit acquires information about positions of other vehicles when the other vehicle deviates from the lane of the vehicle which the driver drives. FIG. 9 is a conceptual view illustrating how the visual line of the driver is changed when the other vehicle deviates from the lane of the vehicle which the driver drives. FIG. 10 is a graph plotting how to control the traveling speed of the vehicle of the driver when the other vehicle deviates from the lane of the vehicle which the driver drives.

Referring to FIG. 8, a plurality of other vehicles A and B may be present in front of the vehicle M which the driver drives, and the preceding-vehicle detection unit 200 may detect the other vehicles A and B to acquire information about positions of the other vehicles.

When the other vehicles A and B are located on the same lane as the vehicle M of the driver, the preceding-vehicle detection unit 200 may detect the other vehicle B first. As illustrated in FIG. 8, when the other vehicle B enters another lane to deviate from the current lane, the preceding-vehicle detection unit 200 may acquire information about a position of the preceding other vehicle A and information about a position of the other vehicle B deviating from the current lane. That is, as described above, the preceding-vehicle detection unit 200 may acquire information about angles at which the other vehicles A and B are located in front of the vehicle M of the driver and information about distances by which the other vehicles A and B are distant from the front of the vehicle M of the driver.

Referring to FIG. 9, when the other vehicle B traveling on the same lane as the vehicle M of the driver deviates from this lane, the driver can look at the other vehicle A. That is, when the other vehicle B deviates from the current lane and travels on another lane, the visual line of the driver may be changed from the other vehicle B to the other vehicle A.

When the driver looks at the other vehicle A, the driver visual line detection unit 100 may acquire information about a visual line P2 of the driver, and the acquired information about the visual line P2 of the driver may be stored in the storage unit 700.

The control unit 300 may choose the target vehicle based on the information about the position of the other vehicle A which is acquired by the preceding-vehicle detection unit 200 and the information about the visual line P2 of the driver which is acquired by the driver visual line detection unit 100.

That is, as described in FIGS. 8 and 9, when the other vehicle B deviates from the lane on which the vehicle M of the driver is located, the control unit 300 may compare the information about the position of the other vehicle A and the information about the visual line P2 of the driver. At this time, when an angle of the other vehicle A detected by the preceding-vehicle detection unit 200 is matched with an angle of the visual line P2 of the driver which is detected by the driver visual line detection unit 100, the control unit 300 may choose the other vehicle A as the target vehicle.

When the other vehicle A is chosen as the target vehicle A, the control unit 300 may control the traveling speed of the vehicle M of the driver in order to control the inter-vehicle distance between the vehicle M of the driver and the target vehicle A.

That is, before the other vehicle B deviates from the lane of the vehicle M of the driver, the control unit 300 controls the traveling speed of the vehicle M of the driver in order to control the inter-vehicle distance from the other vehicle B. However, although the other vehicle B is decelerated to deviate from the lane of the vehicle M of the driver, the target vehicle is chosen as the other vehicle A. Thus, the control unit 300 may control the traveling speed of the vehicle M of the driver in order to control the inter-vehicle distance in relation with the other vehicle A rather than the other vehicle B.

Therefore, when the inter-vehicle distance between the other vehicle A and the vehicle M of the driver is equal to or more than the reference distance stored in the storage unit 700, the control unit 300 may control the speed adjustment unit 500 to increase the traveling speed of the vehicle M of the driver.

Referring to FIG. 10, a speed-time graph, in the case of the vehicle control according to the related art, with which the control unit 300 controls the traveling speed of the vehicle M of the driver in order to control the inter-vehicle distance between the vehicle M of the driver and the target vehicle may be plotted in the form of a line g4. That is, according to the related art, the information about the visual line of the driver is not considered when the target vehicle is chosen. Thus, there is a problem in that, when the other vehicle B located on the same lane as the vehicle M of the driver is decelerated to deviate from this lane, the vehicle M of the driver should be unnecessarily decelerated.

That is, as illustrated in FIG. 10, when the other vehicle B is decelerated to deviate from the lane of the vehicle M of the driver while the vehicle M of the driver is traveling at an initial traveling speed V4, the vehicle M of the driver is also decelerated at that point of time t1, begins to be accelerated at a point of time t3 when the other vehicle B deviates from the lane, and reaches a final traveling speed V3.

In the method for controlling the vehicle according to the disclosed present disclosure in order to solve the problem that the vehicle M of the driver is unnecessarily decelerated when the other vehicle B deviates from the lane of the vehicle M of the driver, a speed-time graph with which the control unit 300 controls the traveling speed of the vehicle M of the driver may be plotted in the form of a line g3.

That is, the information about the position of the other vehicle A which is acquired by the preceding-vehicle detection unit 200 and the information about the visual line P2 of the driver which is acquired by the driver visual line detection unit 100 are compared, and the other vehicle A may be chosen as the target vehicle before the other vehicle B completely deviates from the lane of the vehicle M of the driver.

As illustrated in the graph g3, the vehicle M of the driver does not need unnecessary deceleration at the point of time t1 when the other vehicle B begins to deviate from the lane of the vehicle M of the driver, and the control unit 300 can control the vehicle M of the driver to increase the traveling speed from the point of time t2 when the other vehicle A is chosen as the target vehicle such that the vehicle M of the driver travels at the increased traveling speed.

Figure 11:
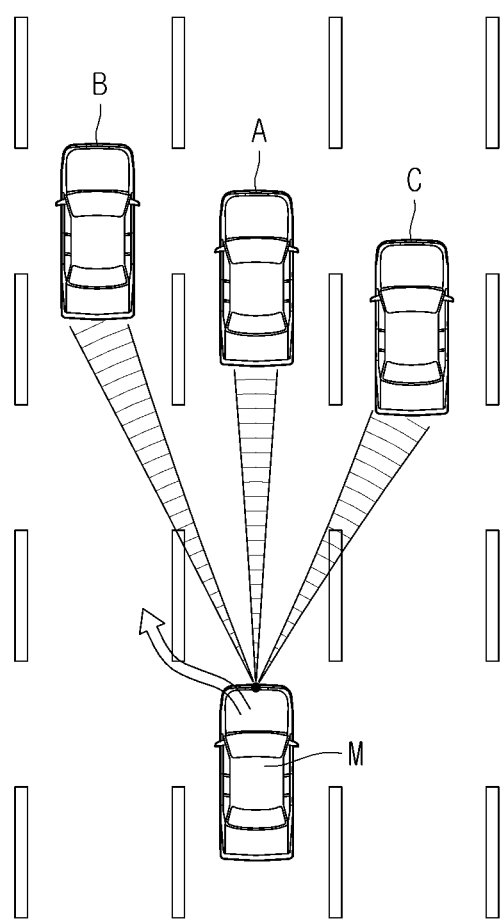
FIG. 11 is a conceptual view illustrating how the preceding-vehicle detection unit acquires information about positions of other vehicles before the vehicle which the driver drives enters another lane.
Figure 12:
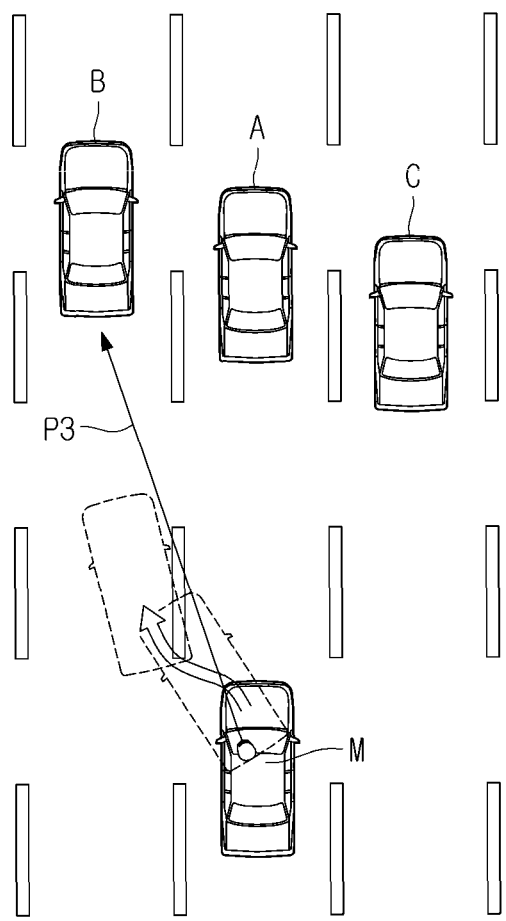
FIG. 12 is a conceptual view illustrating how the visual line of the driver is changed before the vehicle which the driver drives enters the other lane.
Figure 13:
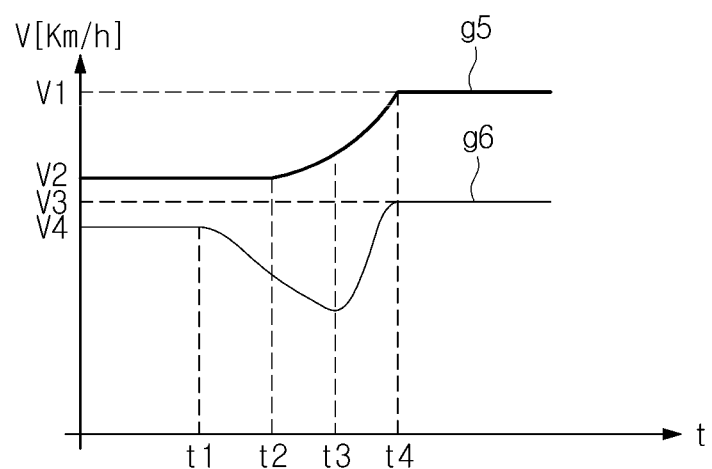
FIG. 13 is a graph plotting how to control the traveling speed of the vehicle of the driver when the vehicle which the driver drives enters the other lane.

FIG. 11 is a conceptual view illustrating how the preceding-vehicle detection unit acquires information about positions of other vehicles before the vehicle which the driver drives enters another lane. FIG. 12 is a conceptual view illustrating how the visual line of the driver is changed before the vehicle which the driver drives enters the other lane. FIG. 13 is a graph plotting how to control the traveling speed of the vehicle of the driver when the vehicle which the driver drives enters the other lane.

Referring to FIG. 11, a plurality of other vehicles A, B, and C may be present in front of the vehicle M which the driver drives, and the preceding-vehicle detection unit 200 may detect the other vehicles A, B, and C to acquire information about positions of the other vehicles.

When detecting the other vehicle A located in front of the same lane as the vehicle M of the driver, the preceding-vehicle detection unit 200 may acquire information about how far the other vehicle A is distant from the vehicle M of the driver. Further, when detecting the other vehicles B and C located on lanes other than the lane of the vehicle M of the driver, the preceding-vehicle detection unit 200 may acquire information about at which angle in which direction positions of the other vehicles B and C are distant based on the front of the vehicle M of the driver that is traveling and information about how far the positions of the other vehicles B and C are distant based on the front of the vehicle M of the driver that is traveling.

The preceding-vehicle detection unit 200 may detect the preceding other vehicles in real time while the vehicle M of the driver is traveling, store the information about the positions of the other vehicle which are acquired as described above in the storage unit 700, and use the stored information to choose the target vehicle.

Referring to FIG. 12, when the vehicle M of the driver attempts to enter a lane on which the other vehicle B is located, the driver can look at the other vehicle B. That is, when the vehicle M of the driver which travels behind the other vehicle A located on the same lane as the vehicle M of the driver attempts to enter the lane on which the other vehicle B is located, a visual line of the driver can be changed from the other vehicle A to the other vehicle B.

When the driver looks at the other vehicle B, the driver visual line detection unit 100 may acquire information about a visual line P3 of the driver, and store the acquired information about the visual line P3 of the driver in the storage unit 700.

The control unit 300 may recognize that the driver operates the steering wheel 40 in order to enter the lane on which the other vehicle B is located. Further, the control unit 300 may choose a target vehicle based on the information about the position of the other vehicle B which is acquired by the preceding-vehicle detection unit 200 and the information about the visual line P3 of the driver which is acquired by the driver visual line detection unit 100.

That is, as described in FIGS. 11 and 12, when the vehicle M of the driver enters the lane on which the other vehicle B is located, the control unit 300 may compare the information about the position of the other vehicle B and the information about the visual line P3 of the driver. At this time, when an angle of the other vehicle B detected by the preceding-vehicle detection unit 200 is matched with an angle of the visual line P3 of the driver which is detected by the driver visual line detection unit 100, the control unit 300 may choose the other vehicle B as the target vehicle.

When the other vehicle B is chosen as the target vehicle, the control unit 300 may control the traveling speed of the vehicle M of the driver in order to control an inter-vehicle distance between the vehicle M of the driver and the target vehicle B.

That is, when the vehicle M of the driver travels on the lane on which the other vehicle A is located, the control unit 300 controls the traveling speed of the vehicle M of the driver in order to control the inter-vehicle distance from the other vehicle A. However, when the other vehicle B is chosen as the target vehicle, the control unit 300 may control the traveling speed of the vehicle M of the driver in order to control the inter-vehicle distance in relation with the other vehicle B rather than the other vehicle A.

Therefore, when the inter-vehicle distance between the other vehicle B and the vehicle M of the driver is equal to or more than the reference distance stored in the storage unit 700, the control unit 300 may control the speed adjustment unit 500 to increase the traveling speed of the vehicle M of the driver.

Referring to FIG. 13, a speed-time graph, in the case of the vehicle control according to the related art, with which the control unit 300 controls the traveling speed of the vehicle M of the driver in order to control the inter-vehicle distance between the vehicle M of the driver and the target vehicle may be plotted in the form of a line g6. That is, according to the related art, the information about the visual line of the driver is not considered when the target vehicle is chosen. Thus, there is a problem in that unnecessary deceleration occurs upon changing the lane.

That is, as illustrated in FIG. 13, when the drivers operates the steering wheel 40 to change the lane while the vehicle M of the driver is traveling at an initial traveling speed V4, the vehicle M of the driver is decelerated at that point of time t1, begins to be accelerated at a point of time t3 when the change of the lane is completed, and reaches a final traveling speed V3.

In the method for controlling the vehicle according to one form of the disclosed present disclosure in order to solve the problem that the vehicle M of the driver is unnecessarily decelerated upon changing the lane, a speed-time graph with which the control unit 300 controls the traveling speed of the vehicle M of the driver may be plotted in the form of a line g5.

That is, according to the disclosed present disclosure, the information about the position of the other vehicle B which is acquired by the preceding-vehicle detection unit 200 and the information about the visual line P3 of the driver which is acquired by the driver visual line detection unit 100 are compared, and the other vehicle B may be chosen as the target vehicle even before the vehicle M of the driver changes the lane.

As illustrated in the graph g5, the vehicle M of the driver does not need the unnecessary deceleration at the point of time t1 when the vehicle M of the driver begins to change the lane, and the control unit 300 can control the vehicle M of the driver to increase the traveling speed from the point of time t2 when the vehicle M of the driver enters another lane such that the vehicle M of the driver travels at the increased traveling speed.

Figure 14:
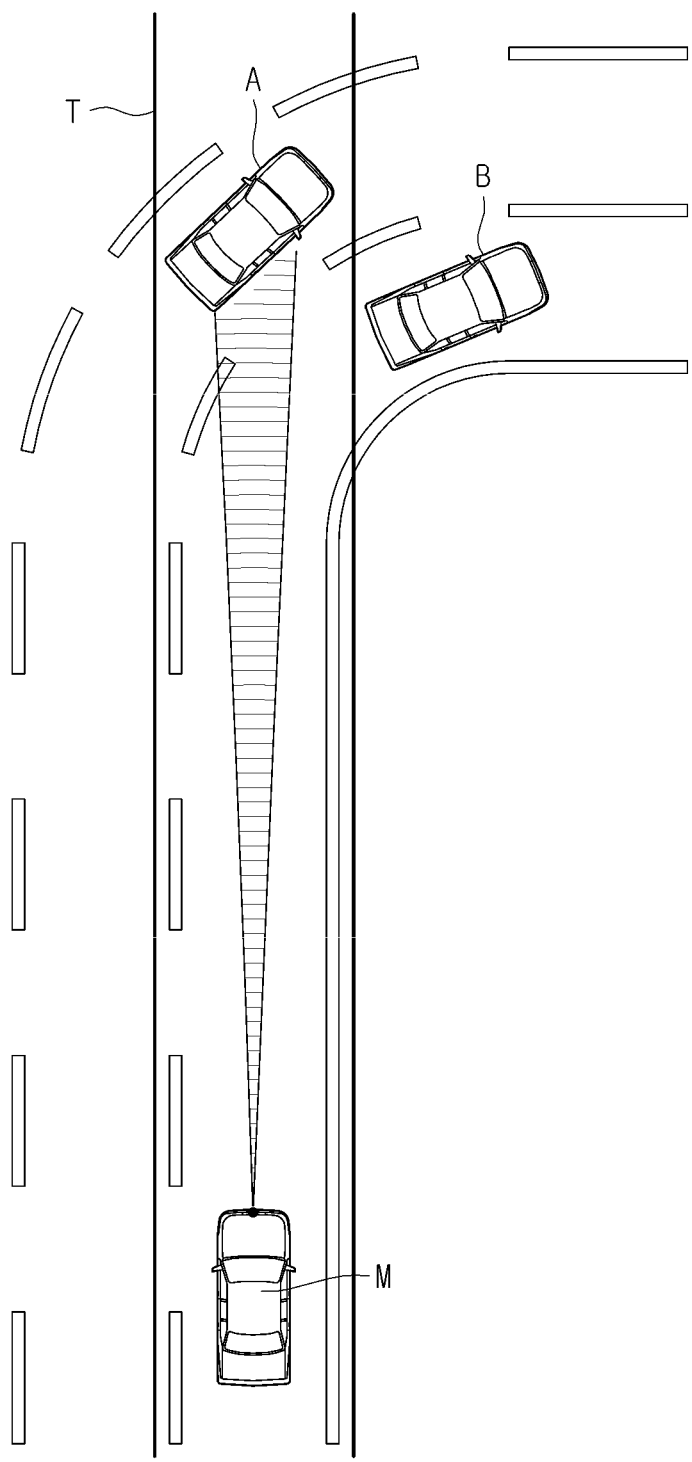
FIG. 14 is a conceptual view illustrating how the preceding-vehicle detection unit acquires information about positions of other vehicles when the other vehicle travels on curved lanes.
Figure 15:
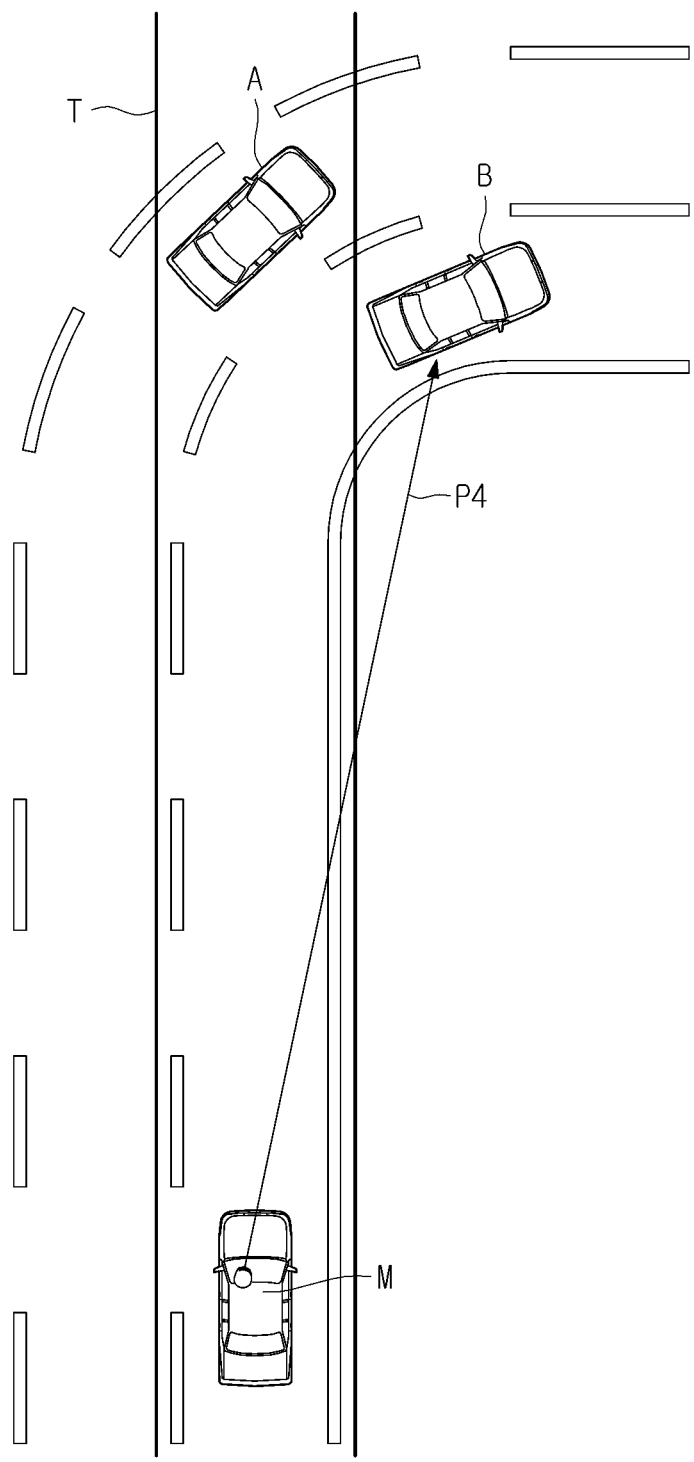
FIG. 15 is a conceptual view illustrating how the driver visual line detection unit acquires information about a visual line of a driver when the other vehicle travels on curved lanes.

FIG. 14 is a conceptual view illustrating how the preceding-vehicle detection unit acquires information about positions of other vehicles when the other vehicle travels on curved lanes. FIG. 15 is a conceptual view illustrating how the driver visual line detection unit acquires information about a visual line of a driver when the other vehicle travels on curved lanes according to one form.

As illustrated in FIG. 14, when the vehicle M of the driver travels, the preceding-vehicle detection unit 200 sets an arbitrary linear lane T for the vehicle M of the driver and detects preceding other vehicles. Thus, when the other vehicle B chosen as the target vehicle deviates from the linear lane T of the vehicle M of the driver while traveling on a curved lane, there is a problem that the other vehicle B is excluded from the target vehicle. Therefore, when the other vehicle B that is chosen as the target vehicle and travels on the same linear lane as the driving vehicle M enters the curved lane, the target vehicle may be searched again as the other vehicle A.

In the method for controlling the vehicle according to the present disclosure, as illustrated in FIG. 15, the driver can look at the other vehicle B that is located on the same lane and travels on the curved lane. At this time, the driver visual line detection unit 100 may acquire information about a visual line P4 of the driver who looks at the other vehicle B, and the preceding-vehicle detection unit 200 may detect information about a position of the other vehicle. The control unit 300 may compare the information about the visual line P4 of the driver with the information about the position of the other vehicle. For this reason, although the other vehicle travels on the curved lane, the other vehicle B may be continuously maintained as the target vehicle.

That is, the control unit 300 may control the speed adjustment unit 500 in order to control an inter-vehicle distance between the other vehicle B chosen as the target vehicle and the vehicle M of the driver according to the information about the visual line P4 of the driver which is acquired by the driver visual line detection unit 100.

Figure 16:
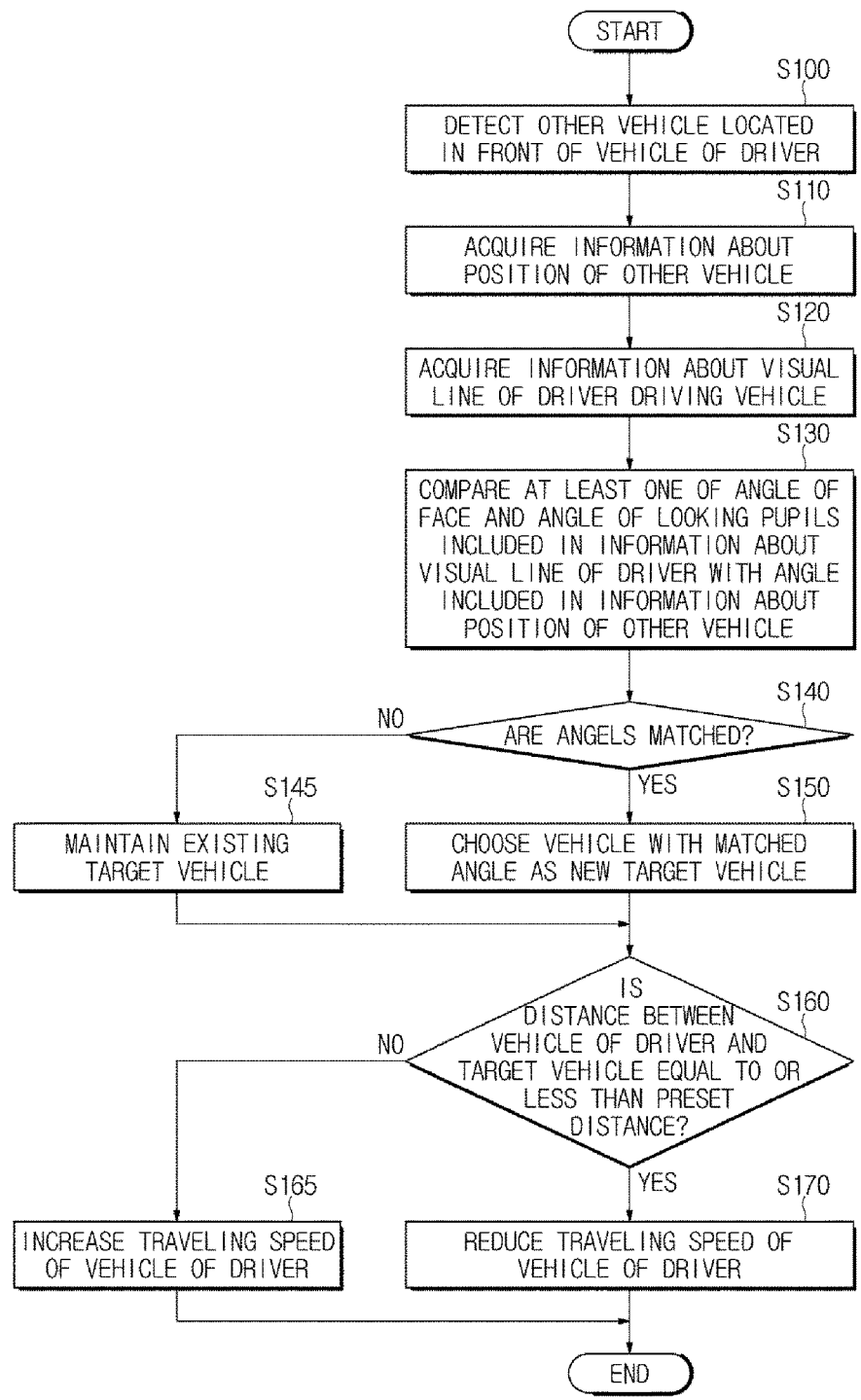
FIG. 16 is a flowchart illustrating a method for controlling a vehicle.

FIG. 16 is a flowchart illustrating a method for controlling a vehicle.

As illustrated in FIG. 16, the preceding-vehicle detection unit 200 may detect at least one other vehicle located in front of the vehicle M which a driver drives (S100), and acquire information about a position of the detected other vehicle (S110). Further, the preceding-vehicle detection unit 200 may transmit the acquired information about the position of the other vehicle to the control unit 300, and store the transmitted information in the storage unit 700.

The driver visual line detection unit 100 may acquire information about a visual line of the driver who drives the vehicle M (S120). That is, the driver face angle detector 105 may detect an angle of a direction in which a face of the driver is directed, and the driver pupil angle detector 110 may detect an angle of a direction in which pupils of the driver look. The information about the visual line of the driver which is acquired by the driver visual line detection unit 100 may be transmitted to the control unit 300, and be stored in the storage unit 700.

A process in which the preceding-vehicle detection unit 200 acquires the information about the position of the other vehicle and a process in which the driver visual line detection unit 100 acquires the information about the visual line of the driver are not limited to the order thereof, and may be performed at the same time.

The control unit 300 may compare the angle included in the information about the position of the other vehicle which is received from the preceding-vehicle detection unit 200 with at least one of the angle of the face and the angle of the looking pupils which are included in the information about the visual line of the driver which is received from the driver visual line detection unit 100 (S130). When the driver visual line detection unit 100 acquires the information about the angle of the direction in which the face of the driver is directed, the angle of the face may be compared with the angle included in the information about the position of the other vehicle. When the driver visual line detection unit 100 acquires the information about the angle of the direction in which the pupils of the driver are directed, the angle of the direction in which the pupils of the driver are directed may be compared with the angle included in the information about the position of the other vehicle.

As the result of comparing the above angles, the control unit 300 may determine whether the angles are matched with each other (S140). The other vehicle having the angle identical to the angle included in the information about the visual line of the driver as the information about the position may be chosen as a new target vehicle (S150).

In contrast, when the compared angles are not matched with each other, the target vehicle that is an existing target vehicle for controlling the inter-vehicle distance may be maintained without choosing a new target vehicle (S145).

When the new target vehicle is chosen, the control unit 300 may control a traveling speed of the vehicle M of the driver such that the inter-vehicle distance between the vehicle M of the driver and the target vehicle becomes a preset distance. That is, the control unit 300 may determine whether the inter-vehicle distance between the vehicle M of the driver and the target vehicle corresponds to the preset distance based on the data stored in the storage unit 700 (S160).

As a result of the determination of the control unit 300, when the inter-vehicle distance between the vehicle M of the driver and the target vehicle is equal to or more than the preset distance, the control unit 300 may control the speed adjustment unit 500 to increase the traveling speed of the vehicle M of the driver (S165).

In contrast, when the inter-vehicle distance between the vehicle M of the driver and the target vehicle is less than the preset distance, the control unit 300 may control the speed adjustment unit 500 to reduce the traveling speed of the vehicle M of the driver (S170).

As described above, it is possible to choose the target vehicle based on the information about the position of the preceding other vehicle and the formation about the visual line of the driver, both of which are acquired through the detection unit provided for the vehicle, and control the traveling speed of the vehicle of the driver in relation with the target vehicle.

According to the information about the visual line of the driver who looks at the other vehicle approaching and entering the lane on which the vehicle of the driver travels, the other vehicle is previously chosen as the target vehicle, and the traveling speed of the vehicle of the driver is controlled in advance in relation with the target vehicle. Thereby, it is possible to prevent the abrupt deceleration and the unnecessary deceleration.

When the driver does not look at the other vehicle deviating from the lane on which the vehicle of the driver travels, the other vehicle is not chosen as the target vehicle. Thereby, it is possible to prevent the abrupt deceleration and the unnecessary deceleration.

When the vehicle which the driver drives changes the lane, the target vehicle is chosen according to the information about the visual line of the driver who looks at the other vehicle located on the lane to be changed. Thereby, it is possible to prevent the unnecessary deceleration and perform smooth acceleration.

In addition, the target vehicle is continuously maintained based on the visual line of the driver when traveling on the curved lane. Thereby, the target vehicle can stably travel on the curved lane.

Although a few forms of the present disclosure have been shown and described, it would be appreciated by those skilled in the art that changes may be made in these forms without departing from the principles and spirit of the present disclosure, the scope of which is defined in the claims and their equivalents.

What is claimed is:

1. A vehicle comprising:
   a preceding-vehicle detection unit configured to detect a plurality of other vehicles located in front of the vehicle of a driver and to acquire information about a position of the plurality of other vehicles;
   a driver visual line detection unit configured to acquire information about a visual line of the driver and an angle of the visual line with respect to a front direction of the vehicle; and
   a control unit configured to choose a target vehicle based on the information about the position of the plurality of other vehicles which is acquired by the preceding-vehicle detection unit and the information about the visual line of the driver which is acquired by the driver visual line detection unit, and configured to control a traveling speed of the vehicle which the driver drives such that an inter-vehicle distance from the target vehicle becomes a preset distance, wherein when the driver respectively looks at first and second vehicles of the plurality of other vehicles, the control unit is configured to compare angles of visual lines corresponding to the first and second vehicles and give different weight values to the first and second vehicles based on a distance from the vehicle when the angles of visual lines are same to each other, and wherein the control unit is configured to choose one of the first and second vehicles as the target vehicle based on the weighted values.

2. The vehicle according to claim 1, wherein the preceding-vehicle detection unit is configured to detect, among the plurality of other vehicles, at least one vehicle located in front of the same lane as the vehicle which the driver drives, another vehicle entering the lane, and another vehicle deviating from the lane.

3. The vehicle according to claim 1, wherein the preceding-vehicle detection unit is configured to detect an angle between the vehicle which the driver drives and at least one vehicle of the plurality other vehicles, and a distance at which the at least one vehicle is located to acquire the information about the position of the at least one vehicle.

4. The vehicle according to claim 1, wherein the driver visual line detection unit is configured to detect an angle of a direction in which a face of the driver is directed or an angle of a direction in which pupils of the driver look to acquire the angle of the visual line of the driver.

5. The vehicle according to claim 1, wherein the control unit is configured to compare an angle between the vehicle of the driver and at least one vehicle of the plurality of other vehicles which is acquired by the preceding-vehicle detection unit with an angle of a direction in which a face of the driver is directed, the angle of the direction in which the face of the driver is directed being acquired by the driver visual line detection unit.

6. The vehicle according to claim 1, wherein the control unit is configured to compare an angle between the vehicle of the driver and at least one vehicle of the plurality of other vehicles which is acquired by the preceding-vehicle detection unit with an angle of a direction in which pupils of the driver look, the angle of the direction in which the pupils of the driver look being acquired by the driver visual line detection unit.

7. The vehicle according to claim 1, wherein when an angle between the vehicle of the driver and at least one vehicle of the plurality of other vehicles is matched with an angle of a direction in which a face of the driver is directed, the control unit is configured to choose the at least one vehicle as the target vehicle.

8. The vehicle according to claim 1, wherein when an angle between the vehicle of the driver and at least one vehicle of the plurality of other vehicles is matched with an angle of a direction in which pupils of the driver look, the control unit is configured to choose the at least one vehicle as the target vehicle.

9. The vehicle according to claim 1, wherein the control unit is configured to control the traveling speed of the vehicle of the driver such that a distance between the vehicle of the driver and the target vehicle which is acquired by the preceding-vehicle detection unit becomes a preset distance.

10. The vehicle according to claim 1, wherein the control unit is configured to reduce the traveling speed of the vehicle of the driver when a distance between the vehicle of the driver and the target vehicle is less than a preset distance; and the control unit is configured to increase the traveling speed of the vehicle of the driver when a distance between the vehicle of the driver and the target vehicle is equal to or more than a preset distance.

11. The vehicle according to claim 1, further comprising a storage unit configured to store the information of the position of the plurality of other vehicles which is acquired by the preceding-vehicle detection unit, the information of the visual line of the driver which is acquired by the driver visual line detection unit, and the inter-vehicle distance between the vehicle of the driver and at least one vehicle of the plurality of other vehicles.

12. A method for controlling a vehicle, comprising:
detecting a plurality of other vehicles located in front of the vehicle of a driver and acquiring information related to a position of the plurality of other vehicles;
acquiring information related to a visual line of the driver and an angle of the visual line with respect to a front direction of the vehicle;
choosing a target vehicle based on the acquired information about the position of the plurality of other vehicles and the acquired information about the visual line of the driver; and
controlling a traveling speed of the vehicle of the driver such that an inter-vehicle distance from the target vehicle becomes a preset distance,
wherein the choosing the target vehicle includes:
when the driver respectively looks at first and second vehicles of the plurality of other vehicles, obtaining angles of visual lines corresponding to the first and second vehicles,
comparing the obtained angles and giving a weight value to the first and second vehicles based on a distance from the vehicle when the angles of the visual lines are same to each other, and
choosing the target vehicle based on the weighted values.

13. The method according to claim 12, wherein the acquiring of the information about the position of the plurality of other vehicles includes recognizing, among the plurality of other vehicles, at least one vehicle located in front of the same lane as the vehicle which the driver drives, another vehicle entering the lane, and other vehicle deviating from the lane.

14. The method according to claim 12, wherein the acquiring of the information about the position of the plurality of other vehicles includes detecting an angle between the vehicle which the driver drives and at least one vehicle of the plurality of other vehicles and a distance at which the at least one vehicle is located.

15. The method according to claim 12, wherein the acquiring of the information about the visual line of the driver includes detecting an angle of a direction in which a face of the driver is directed or an angle of a direction in which pupils of the driver look.

16. The method according to claim 12, wherein the choosing of the target vehicle includes comparing an acquired angle between the vehicle of the driver and at least one vehicle of the plurality of other vehicles with an acquired angle of a direction in which a face of the driver is directed.

17. The method according to claim 12, wherein the choosing of the target vehicle includes comparing an acquired angle between the vehicle of the driver and at least one vehicle of the plurality of other vehicles with an acquired angle of a direction in which pupils of the driver look.

18. The method according to claim 12, wherein the choosing of the target vehicle includes choosing at least one vehicle of the plurality of other vehicles as the target vehicle when an angle between the vehicle of the driver and the at least one vehicle is matched with an angle of a direction in which a face of the driver is directed.

19. The method according to claim 12, wherein the choosing of the target vehicle includes choosing at least one vehicle of the plurality of other vehicles as the target vehicle when an angle between the vehicle of the driver and the at least one vehicle is matched with an angle of a direction in which pupils of the driver look.

20. The method according to claim 12, wherein the controlling of the traveling speed of the vehicle of the driver includes controlling the traveling speed of the vehicle of the driver such that an acquired distance between the vehicle of the driver and the target vehicle becomes a preset distance.

21. The method according to claim 12, wherein the controlling of the traveling speed of the vehicle of the driver comprises:
- reducing the traveling speed of the vehicle of the driver when a distance between the vehicle of the driver and the target vehicle is less than a preset distance; and
- increasing the traveling speed of the vehicle of the driver when a distance between the vehicle of the driver and the target vehicle is equal to or more than a preset distance.

* * * * *